March 6, 1934.                J. L. BRULATOUR                1,949,451
PIPE COUPLER
Filed Aug. 23, 1932
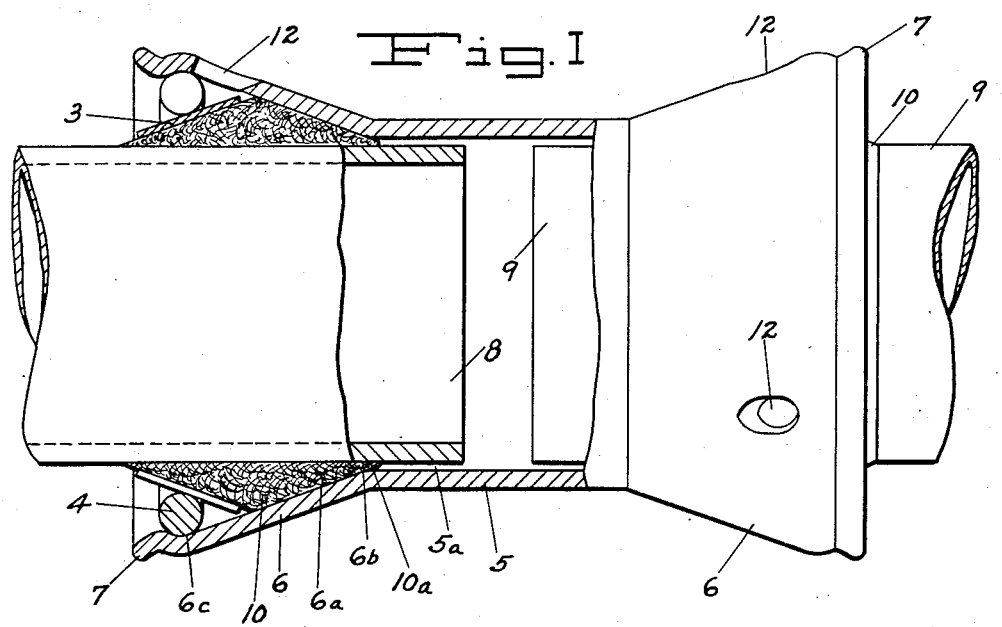
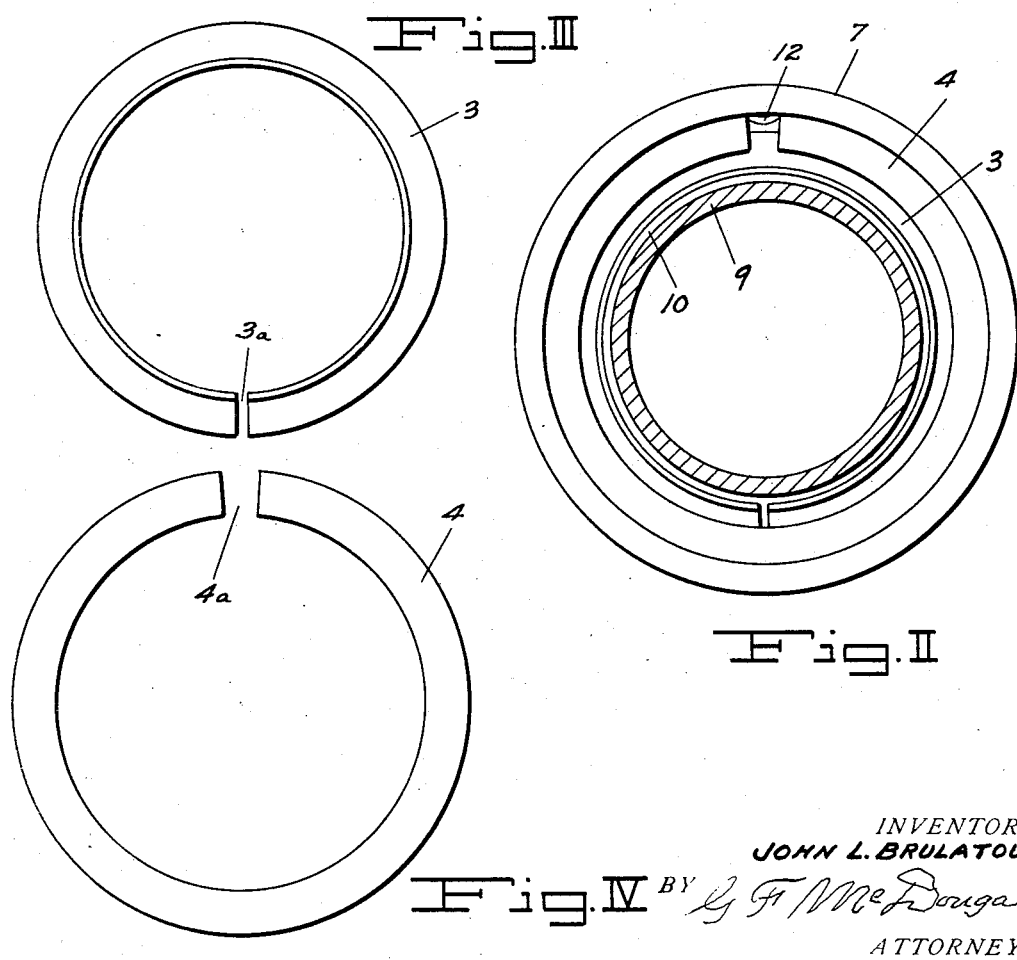
INVENTOR
JOHN L. BRULATOUR.
BY G. F. McDougall.
ATTORNEY Patented Mar. 6, 1934

1,949,451

UNITED STATES PATENT OFFICE 1,949,451

PIPE COUPLER

John L. Brulatour, Portland, Oreg.

Application August 23, 1932, Serial No. 630,125

7 Claims. (Cl. 285—196)

My invention relates to devices for coupling unthreaded or blank ends of pipe for the conveyance of fluids and is particularly adapted for pipes conveying water, gas or other substance required to be conveyed to a distance.

I am aware that couplers for the purpose have been made and tried in great variety. The problem here presented is a coupler that may be tightened onto a pipe line either to join two blank ends together as shown in the drawing or where a half coupler is formed on one end of a pipe and a blank end inserted therein.

No successful device has heretofore been made so far as I know that does not employ bolts or some threaded device to impose an initial compression upon a packing material, except the old lead and oakum joint.

Unless such initial compression is imposed, rugosity of the surface of the pipe and of other parts in contact with the packing prevent attaining a tightness or closeness of contact between the several parts sufficient to prevent initial leakage. A great many of them will hold enormous pressures after the pressure is raised; but those without threaded devices for compressing the rubber will in almost all cases show a substantial leakage while the pressure is low. This is especially undesirable in a gas line where pressures are usually low at all times.

The objection to the threaded devices is first cost and more important, the cost of applying in the field and the fact that threaded devices, particularly where installed under ground are affected by rust so that taking them apart is difficult. A device employing bolts requires what is known as a "bell hole" where each joint is employed, in order that the workmen may tighten the bolts in place, which is a time consuming operation.

The objects of my invention are to eliminate the disadvantages of the prior art as above enumerated and to present such other advantages in cost of manufacture, efficiency in use and ease of installation as will appear from the subjoined specification, and the advantages apparent from the employment of the structure are particularly pointed out in the claims.

A drawing accompanies and forms a part of this specification, in which,

Fig. I is a plan view of a pipe joint in situ made according to my new invention and shown partly in section to disclose its method of use;

Fig. II is an end view taken from the right-hand end of Fig. I;

Fig. III is an end view of the frustro-conical shield hereafter designated in the drawing by numeral 3; and, Fig. IV is a plan view of the snap ring designated in the drawing by numeral 4 and shown in section in Fig. I.

The device consists essentially of a cylindrical portion 5, in the form of a sleeve which should be larger in internal diameter than the external diameter of the pipe with which it is to be used. I prefer to make this sleeve of ductile material such as soft steel and formed thereon is the tapered portion 6, the interior of which shown by the line 6a is preferably nearly a straight line and makes an angle with 5 at the point indicated by 6b. Near the outside end of the tapered portion 6 is formed an internal annular groove 6c, and then an outwardly flaring lip 7.

I prefer to make the snap ring 4, of spring wire so that it may be driven in place with a calking tool by starting at one end and working around the circle. This is a very effective way of placing the snap ring in place and if made of spring wire the snap ring will neither break nor distort.

Obviously this structure may be rolled on the end of a pipe making what resembles a "bell end" or it may be made to join two blank ends as shown in the drawing.

As shown in the drawing a blank end of pipe such as 8 or 9 has slipped over it first a snap ring 4, second the frustro-conical shield 3, and third the gasket member 10, preferably made of obtuse triangular section as shown in Fig. I, the blank end 8, is then inserted within the sleeve 5, to about a proportionate distance as shown, the gasket member 10, is slipped up into the tapered portion 6, so that it will have a snug bearing on the surface 6a, then the frustro-conical shield 3, then the snap ring 4, which is made open on one side as shown at 4a, is brought up and forcibly placed within the annular groove 6c.

The gasket member 10, should be made of comparatively soft rubber or any substance having the well known characteristics of rubber and in this specification and claims the word rubber will be defined to include all such substances. Where a pipe line is intended to convey fluids that have a deleterious effect upon rubber, such as illuminating gas, it is customary to employ a lead shield or tip for the gasket member. It is also possible to find synthetic resilient materials for a gasket member that are resistant to oil and various solvents. These may be employed with my invention but are not part of it.

The gasket 10, should be of such proportions and length and shape that the edge 10a, will extend a substantial distance within the straight portion of the sleeve 5 as shown. It also should be of such proportion that forcing the snap ring 4 into the annular groove 6c, will require considerable force, to impose a substantial initial compression upon the resilient gasket 10.

If the several parts are made in correct proportion so that the rubber gasket 10, is forced in as described and the portion 10a, extends into the annular space 5a, between the sleeve 5, and the end of the pipe, then initial pressure of the water such as low pressure while the pipe is filling will be securely held. Increased pressure acting on 10a tends to drive it back into the space occupied by the gasket 10, increasing the bulk thereof and forcing the gasket to fully occupy every pore and irregularity to be found on the surface 6a, and on the surface of the embraced pipe and results in a joint that is hermetically tight at all pressures.

I preferably make the frustro-conical shield 3, split as shown at 3a and thus it is always possible should a joint show a leakage to start the snap ring out of its seat by a punch inserted through the hole 12, whereupon the snap ring 4, may be readily removed and another frustro-conical shield 3, may be placed on top of the original one to afford additional pressure upon the gasket 10.

It is also possible to tighten the joint in place very effectively by blows of an ordinary hand hammer on the lip 7 or in case of very high pressures it may be beaded down over the snap ring 4 to afford additional security.

It will be noted that the force transmitted by interior fluid pressure as finally resisted by the snap ring 4, will be substantially perpendicular to the surface of the frustro-conical member 3, so that the snap ring 4, is forced into its seat rather than out of it.

In cases of very large pipes there is always an abundance of room in the trench provided so that a joint can be made up or taken down without a bell hole. Where a trench is dug with a trenching machine and its width substantially that of the diameter of the pipe, a few shovelfuls of soil may be removed around the joint but very much less than is required with other structures.

Thus it will be seen that I have developed an entirely new structure of the character indicated. It has every advantage possessed by the screw threaded apparatuses without their inherent infirmities. It has more advantage than the slip-joint type employing a cup rubber since it can be made positively tight initially before pressure is turned in and if a leakage shows it can be tightened in situ more readily than can a screw threaded device.

Considerable detail has been shown in the drawing and I wish it to be understood that various modifications are easily possible without departing from the principle of the invention herein disclosed and I wish the drawing to be regarded as an illustration of the best way in which I contemplate carrying out my invention, but not as the sole way in which it may be performed.

With this understanding, what I claim as new and desire to secure by Letters Patent is:—

1. In a pipe coupler, a cylindrical sleeve member, an outwardly flared portion of said sleeve member provided with an annular inner groove, a resilient gasket adapted to bear upon an inserted pipe and upon the walls of the flared portion, a frustro-conical shield for said gasket member and a retaining ring adapted to be driven in said groove and against said shield and impress substantial initial compression on the gasket member and wherein pressure from the shield tends to force the retaining ring toward its seat.

2. A pipe coupler defined in part as a sleeve with a flared end, an internal groove in said flared end, a split retaining ring adapted to be driven in said groove, a shield member bearing against said retaining ring substantially perpendicular to the seat therefor and a resilient gasket member adapted to be initially compressed against a contained pipe and against the inner walls of the flared end by pressure superposed by the retaining ring upon the shield.

3. In a pipe coupler, a cylindrical sleeve member adapted to contain a pipe with an annular space between the sleeve and the pipe, a three side gasket adapted to embrace a contained pipe, a flared end portion of said sleeve member adapted to conform to the outline of one side of the gasket, a shield member adapted to bear upon another side of the said gasket, a retaining ring to be driven against said shield member and impress substantial compression upon the gasket member and a seat provided within the flared portion to retain the ring in position that is substantially perpendicular to the outer face of the shield member.

4. A pipe coupler defined in part as a sleeve with a flared end, the said sleeve and the said flared end being adapted to surround a pipe to be coupled, a gasket adapted to occupy a portion of the annular space between the flared end and a contained pipe with a portion thereof projecting within the sleeve proper, a shield for said gasket member, a retaining ring for said shield member and a seat within said flared end whereby the said retaining ring may be locked against the said shield member with substantial force.

5. In a pipe coupler, a cylindrical sleeve member, an outwardly flared end of said sleeve member, an annular groove within said flared portion, a resilient gasket adapted to bear upon an inserted pipe and upon a portion of the wall of the flared portion, a shield member adapted to bear against said gasket, a retaining ring for said shield member and a seat within the flared portion for holding the said retaining ring against said shield with substantial force.

6. As a new article of manufacture, a pipe coupler adapted to couple blank ends of pipe that consists essentially of a cylindrical sleeve having an inside diameter that is larger than the pipes to be coupled, flared ends for said sleeve, gaskets for said flared ends and means including shields and snap rings for retaining the gaskets in position under substantial pressure, substantially as specified.

7. As a new article of manufacture, a pipe coupler defined as an enlarged cylindrical portion formed on the end of a pipe, an outwardly flared bell for said cylindrical portion, a resilient gasket for said flared portion that is adapted to bear on the walls of said flared portion and a contained pipe, and shield and lock ring means for retaining the gasket under substantial initial compression substantially as described.

JOHN L. BRULATOUR.